(12) United States Patent
Jeong et al.

(10) Patent No.: US 9,883,466 B2
(45) Date of Patent: Jan. 30, 2018

(54) METHOD AND APPARATUS FOR MANAGING RADIO RESOURCE IN WIRELESS COMMUNICATION SYSTEM

(71) Applicants: Samsung Electronics Co., Ltd., Gyeonggi-do (KR); Seoul National University R&DB Foundation, Seoul (KR)

(72) Inventors: Ji-Woo Jeong, Seoul (KR); Seong-Won Kim, Seoul (KR); Yeon-Chul Shin, Seoul (KR); Seo-Min Yang, Gyeonggi-do (KR); Jin-Woo Yang, Gyeonggi-do (KR); Seung-Min Yoo, Seoul (KR); Sung-Hyun Choi, Seoul (KR); Chul-Hoon Hwang, Gyeonggi-do (KR)

(73) Assignees: SAMSUNG ELECTRONICS CO., LTD., Suwon-si, Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 37 days.

(21) Appl. No.: 14/905,954

(22) PCT Filed: Jul. 23, 2014

(86) PCT No.: PCT/KR2014/006689
§ 371 (c)(1),
(2) Date: Jan. 18, 2016

(87) PCT Pub. No.: WO2015/012585
PCT Pub. Date: Jan. 29, 2015

(65) Prior Publication Data
US 2016/0165555 A1    Jun. 9, 2016

(30) Foreign Application Priority Data
Jul. 26, 2013  (KR) .................... 10-2013-0089015

(51) Int. Cl.
*H04W 52/34* (2009.01)
*H04W 16/10* (2009.01)
(Continued)

(52) U.S. Cl.
CPC ........... *H04W 52/34* (2013.01); *H04W 16/10* (2013.01); *H04W 52/243* (2013.01);
(Continued)

(58) Field of Classification Search
CPC . H04W 16/10; H04W 52/243; H04W 52/245; H04W 52/34; H04W 52/362; H04W 72/0453; H04W 72/085
See application file for complete search history.

(56) References Cited

U.S. PATENT DOCUMENTS 7,116,979 B2   10/2006 Backes et al.
8,064,413 B2   11/2011 Savoor et al.
(Continued)

OTHER PUBLICATIONS

International Search Report dated Dec. 12, 2014 in connection with PCT/KR2014/006689; 6 pages.
(Continued)

*Primary Examiner* — Kashif Siddiqui

(57) ABSTRACT

A method and an apparatus for performing transmission power selection of a wireless access device and channel allocation in a combination manner, for resource management optimized for a wireless network environment supporting multimedia traffic are provided. In a method for managing a radio resource of at least one Access Point (AP) in a wireless communication network, a transmission power select operation for the AP is performed on each of a plurality of channel settings, and a network performance value is predicted. Optimized channel setting is selected among the plurality of channel settings depending on the predicted network performance value. The optimized chan-
(Continued)

nel setting and optimized transmission power corresponding to the optimized channel setting are allocated to the AP.

20 Claims, 10 Drawing Sheets

(51) Int. Cl.
*H04W 52/24* (2009.01)
*H04W 52/36* (2009.01)
*H04W 72/04* (2009.01)
*H04W 72/08* (2009.01)

(52) U.S. Cl.
CPC ....... *H04W 52/245* (2013.01); *H04W 52/362* (2013.01); *H04W 72/0453* (2013.01); *H04W 72/085* (2013.01)

(56) References Cited

U.S. PATENT DOCUMENTS

| | | | | |
|---|---|---|---|---|
| 2005/0003827 | A1* | 1/2005 | Whelan | H04W 16/10 455/454 |
| 2008/0019345 | A1* | 1/2008 | Wu | H04W 16/10 370/341 |
| 2008/0112499 | A1* | 5/2008 | Bennett | H04W 74/006 375/267 |
| 2009/0168712 | A1 | 7/2009 | Douglas et al. | |
| 2009/0268671 | A1 | 10/2009 | Cave et al. | |
| 2009/0296647 | A1 | 12/2009 | Friday et al. | |
| 2010/0238871 | A1 | 9/2010 | Tosic et al. | |
| 2012/0002567 | A1 | 1/2012 | Sun et al. | |
| 2013/0028158 | A1 | 1/2013 | Lee et al. | |
| 2014/0314003 | A1* | 10/2014 | Zhou | H04W 48/16 370/329 |

OTHER PUBLICATIONS

Written Opinion of the International Searching Authority dated Dec. 12, 2014 in connection with PCT/KR2014/006689; 6 pages.

Cisco Systems, Inc.; "Cisco Wireless Controller Configuration Guide"; Release 7.0.98.0; Jun. 2010; 960 pages.

Akl, et al.; "Dynamic Channel Assignment in IEEE 802.11 Networks"; IEEE Conference on Portable Information Devices; May 25-29, 2007; Orlando, FL; 7 pages.

Kazdaridis, et al.; "Novel Metrics and Experimentation Insights for Dynamic Frequency Selection in Wireless LANs"; ACM WiNTECH '11; Sep. 19, 2011; Las Vegas, NV; 9 pages.

Leung, et al.; "Frequency Assignment for Multi-Cell IEEE 802.11 Wireless Networks"; Disclosure from U.S. Pat. No. 7206586 B2; Granted Apr. 17, 2007; 7 pages.

Li, et al.; "Achieving Proportional Fairness via AP Power Control in Multi-Rate WLANs"; IEEE Transactions on Wireless Communications; Sep. 23, 2011; 10 pages.

* cited by examiner

[Fig. 1]
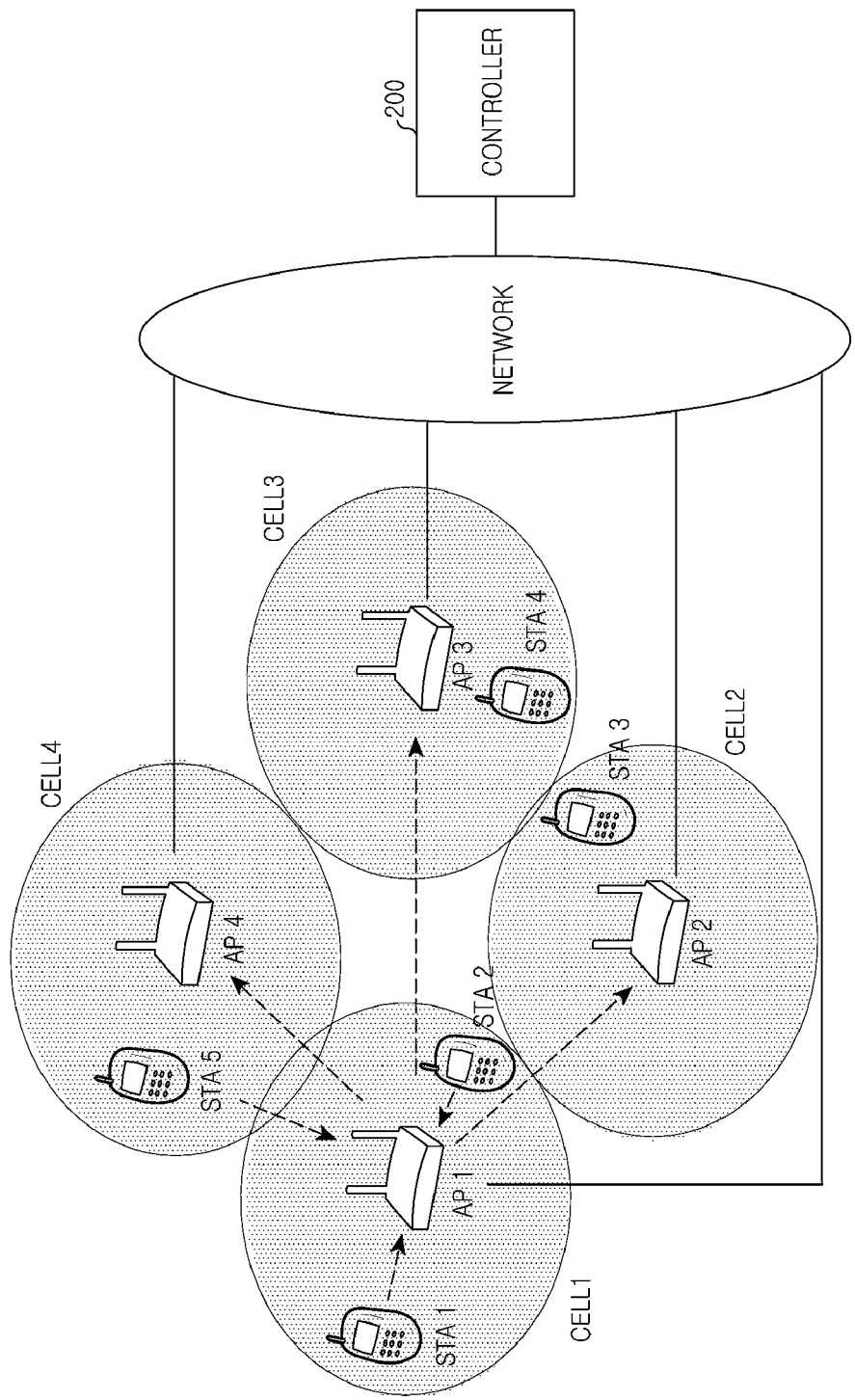

[Fig. 2]
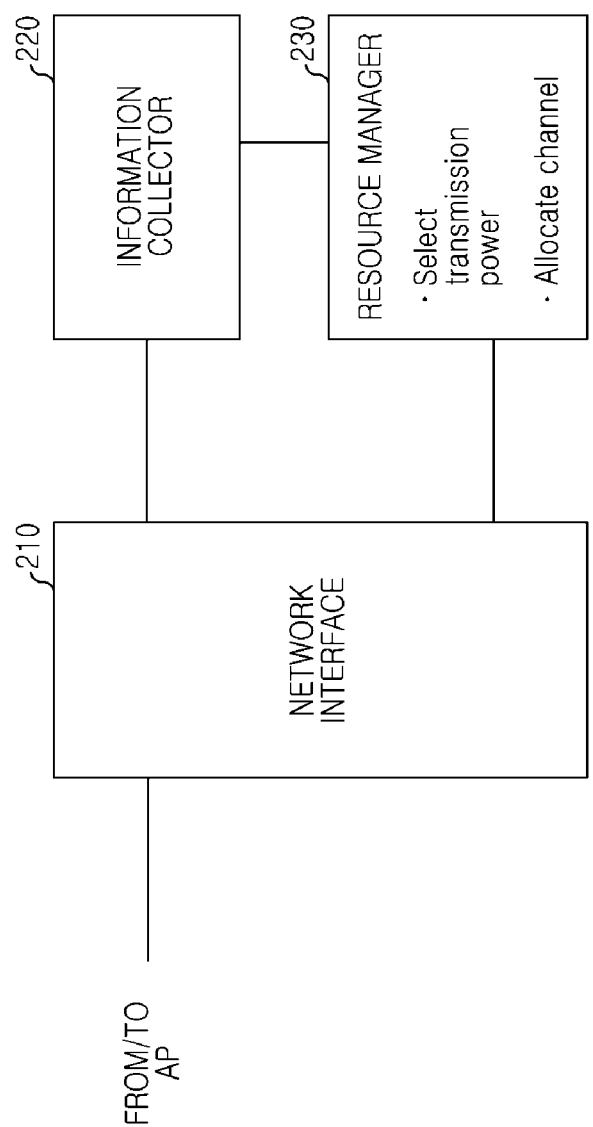

[Fig. 3]
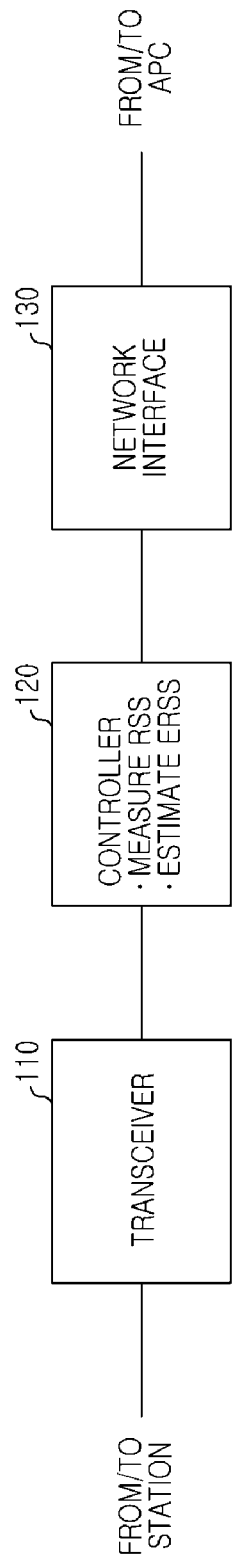

[Fig. 4]
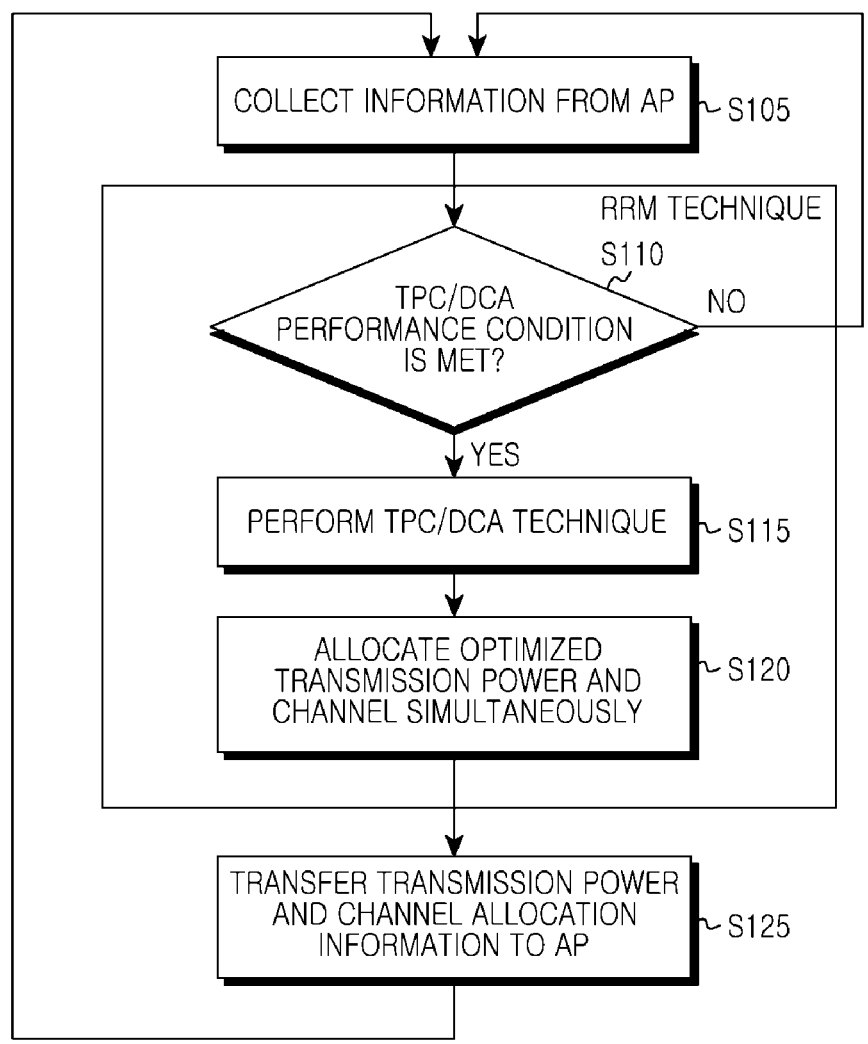

[Fig. 5]
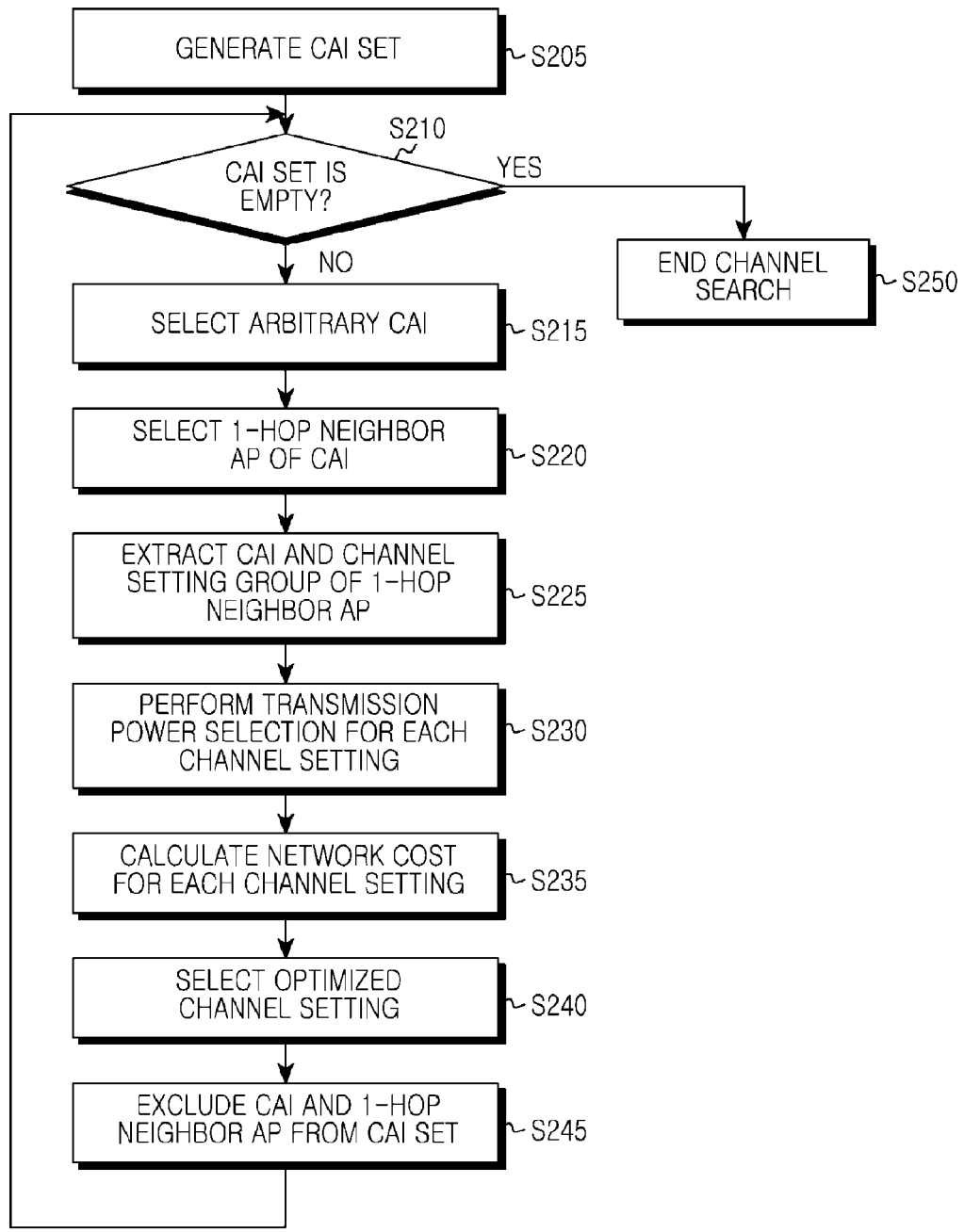

[Fig. 6]
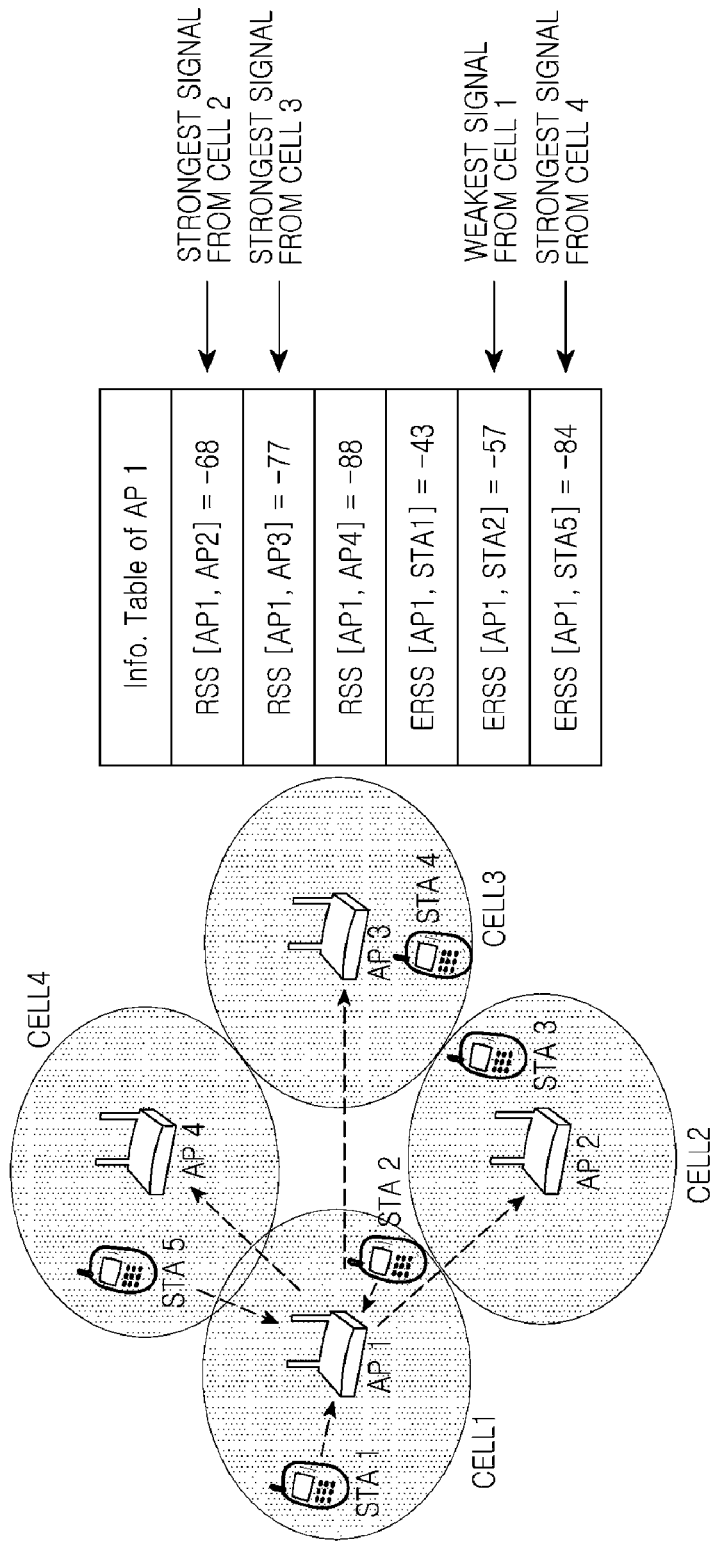

[Fig. 7a]

| From<br>To | Cell 1 (dBm) | Cell 2 (dBm) | Cell 3 (dBm) | Cell 4 (dBm) | Cell 5 (dBm) | Cell 6 (dBm) | Cell 7 (dBm) | Cell 8 (dBm) | Cell 9 (dBm) |
|---|---|---|---|---|---|---|---|---|---|
| Cell 1 | (-57) | -68 | -77 | -84 | -64 | -73 | -80 | -81 | -82 |
| Cell 2 | -55 | (-50) | -65 | -78 | -73 | -62 | -71 | -78 | -86 |
| Cell 3 | -73 | -66 | (-29) | -68 | -78 | -66 | -69 | -73 | -83 |
| Cell 4 | -82 | -77 | -69 | (-64) | -86 | -77 | -78 | -71 | -84 |
| Cell 5 | -69 | -74 | -82 | -87 | (-16) | -70 | -72 | -84 | -74 |
| Cell 6 | -71 | -74 | -70 | -84 | -64 | (-57) | -56 | -75 | -78 |
| Cell 7 | -77 | -74 | -68 | -69 | -78 | -68 | (-54) | -60 | -83 |
| Cell 8 | -81 | -84 | -71 | -68 | -84 | -77 | -73 | (-67) | -83 |
| Cell 9 | -77 | -85 | -84 | -86 | -66 | -76 | -78 | -85 | (-49) |

| From / To | Cell 1 (dBm) | Cell 2 (dBm) | Cell 3 (dBm) | Cell 4 (dBm) | Cell 5 (dBm) | Cell 6 (dBm) | Cell 7 (dBm) | Cell 8 (dBm) | Cell 9 (dBm) |
|---|---|---|---|---|---|---|---|---|---|
| Cell 1 | (-57) |  |  |  | -64 |  |  |  | -82 |
| Cell 2 |  | (-50) |  | -68 |  | -60 |  | -78 |  |
| Cell 3 |  |  | (-29) |  |  |  |  |  |  |
| Cell 4 |  | -77 |  | (-64) | (-16) | -77 | -69 | -71 |  |
| Cell 5 | -69 |  |  |  |  |  |  |  | -74 |
| Cell 6 |  | -74 |  | -84 |  | (-57) |  |  |  |
| Cell 7 |  |  | -68 |  |  |  | (-54) | -75 |  |
| Cell 8 |  | -84 |  | -68 |  | -77 |  | (-67) |  |
| Cell 9 | -77 |  |  |  | -66 |  |  |  | (-49) |

| From<br>To | Cell 1<br>(dBm) | Cell 2<br>(dBm) | Cell 3<br>(dBm) | Cell 4<br>(dBm) | Cell 5<br>(dBm) | Cell 6<br>(dBm) | Cell 7<br>(dBm) | Cell 8<br>(dBm) | Cell 9<br>(dBm) |
|---|---|---|---|---|---|---|---|---|---|
| Cell 1 | (21) | (21) |  |  | 26 |  |  |  | 8 |
| Cell 2 |  |  | (21) | 22 |  | 30 |  | 12 |  |
| Cell 3 |  | 13 |  | (12) |  | 13 | 21 | 19 |  |
| Cell 4 | 21 |  | 22 | 6 | (21) |  |  |  |  |
| Cell 5 |  | 16 |  |  |  | (21) |  | 15 | 16 |
| Cell 6 |  |  |  |  |  |  | (21) |  |  |
| Cell 7 | 13 | 6 |  | 22 | 24 | 13 |  |  |  |
| Cell 8 |  |  |  |  |  |  |  | (9) |  |
| Cell 9 |  |  |  |  |  |  |  |  | (21) |

[Fig. 7d]

| RII | AP1 | AP2 | AP3 | AP4 | AP5 | AP6 | AP7 | AP8 | AP9 | Network cost |
|---|---|---|---|---|---|---|---|---|---|---|
| | 0 | 0 | 1 | 20 | 8 | 9 | 0 | 19 | 0 | 57 |

METHOD AND APPARATUS FOR MANAGING RADIO RESOURCE IN WIRELESS COMMUNICATION SYSTEM

CROSS-REFERENCE TO RELATED APPLICATIONS AND CLAIM OF PRIORITY

The present application claims priority under 35 U.S.C. §365 to International Patent Application No. PCT/KR2014/006689 tiled Jul. 23, 2014, entitled "METHOD AND APPARATUS FOR MANAGING RADIO RESOURCE IN WIRELESS COMMUNICATION SYSTEM", and, through International Patent Application No. PCT/KR2014/006689, to Korean Patent Application No. 10-2013-0089015 filed Jul. 26, 2013, each of which are incorporated herein by reference into the present disclosure as if fully set forth herein.

TECHNICAL FIELD

The present invention relates to a method and an apparatus for managing a radio resource in a wireless communication system.

BACKGROUND ART

Together with improvement in performance of a mobile apparatus, a demand for a multimedia service such as data communication and Voice over Internet Protocol (VoIP) in a wireless network increases. For example, IEEE 802.11a/b/g/n wireless LAN-based Wireless Fidelity (WiFi) system is a wireless access technology that may efficiently support data and multimedia services in establishment of a wireless network in aspects of performance and system establish costs.

In a wireless network that uses WiFi, to reduce a coverage hole inside a building and support a high transmission rate for a station (STA), a plurality of access points (APs) are densely installed. Under this environment, to maximize performance of a wireless network, a radio resource management (RRM) technique that efficiently manages a radio resource of a frequency band (e.g., 2.4 GHz, 5 GHz) used by WiFi is required.

DISCLOSURE OF INVENTION

Solution to Problem

An aspect of the present invention is to address at least the above-mentioned problems and/or disadvantages and to provide at least the advantages described below. Accordingly, an aspect of the present invention is to provide a method and an apparatus for managing a radio resource in a wireless network.

Another aspect of the present invention is to provide a method and an apparatus for selecting transmission power of a wireless access device and allocating a dynamic channel in a wireless network.

Still another aspect of the present invention is to provide a method and an apparatus for performing transmission power selection of a wireless access device and channel allocation in a combination manner, for resource management optimized for a wireless network environment supporting multimedia traffic.

In accordance with an aspect of the present invention, a method for managing a radio resource of at least one Access Point (AP) in a wireless communication network is provided. The method includes performing a transmission power select operation for the AP on each of a plurality of channel settings, and predicting a network performance value, and selecting optimized channel setting among the plurality of channel settings depending on the predicted network performance value, and allocating the optimized channel setting and optimized transmission power corresponding to the optimized channel setting to the AP.

In accordance with another aspect of the present invention, a method for allocating transmission power of at least one Access Point (AP) in a wireless communication network is provided. The method includes determining first transmission power meeting a cell outer condition between the AP and APs selected among a plurality of APs, and determining second transmission power smaller than the first transmission power and meeting a cell inner condition of the AP. The cell outer condition includes a case where signal strength between the AP and at least one external neighbor cell is less than a first threshold determined in advance. The cell inner condition includes a case where signal strength between the AP and at least one internal station belonging to the AP is greater than a second threshold determined in advance. The second threshold has a value less than the first threshold, and is adaptively set based on traffic information used for communication between the AP and the internal station.

In accordance with still another aspect of the present invention, a controller device for managing a radio resource of at least one Access Point (AP) in a wireless communication network is provided. The controller device includes an information collector configured to collect information from the AP, and a resource manager configured to perform a transmission power select operation for the AP on each of a plurality of channel settings, predict a network performance value, select optimized channel setting among the plurality of channel settings depending on the predicted network performance value, and allocate the optimized channel setting and optimized transmission power corresponding to the optimized channel setting to the AP.

In accordance with yet another aspect of the present invention, an apparatus for allocating transmission power of at least one Access Point (AP) in a wireless communication network is provided. The apparatus includes an information collector configured to collect information regarding signal strength between the AP and at least one external neighbor cell, and signal strength between the AP and at least one internal station belonging to the AP, and a resource manager configured to determine first transmission power meeting a cell outer condition between the AP and APs selected among a plurality of APs, and determine second transmission power smaller than the first transmission power and meeting a cell inner condition of the AP. The cell outer condition includes a case where signal strength between the AP and at least one external neighbor cell is less than a first threshold determined in advance. The cell inner condition includes a case where signal strength between the AP and at least one internal station belonging to the AP is greater than a second threshold determined in advance. The second threshold has a value less than the first threshold, and is adaptively set based on traffic information used for communication between the AP and the internal station.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments of the present invention will be more apparent from the following description taken in conjunction with the accompanying drawings in which:

FIG. 1 is a view illustrating a structure of a wireless network to which embodiments of the present invention are applied;

FIG. 2 is a block diagram illustrating the construction of a wireless access device controller according to an embodiment of the present invention;

FIG. 3 is a block diagram illustrating the construction of a wireless access device according to an embodiment of the present invention;

FIG. 4 is a flowchart illustrating a resource management operation according to an embodiment of the present invention;

FIG. 5 is a flowchart illustrating in detail a transmission power control and dynamic channel allocation operation according to an embodiment of the present invention;

FIG. 6 is a view illustrating an example of information collection by a transmission power control and dynamic channel allocation operation according to an embodiment of the present invention; and FIGS. 7A to 7D are views illustrating examples of a transmission power control and dynamic channel allocation operation according to an embodiment of the present invention.

Throughout the drawings, like reference numerals will be understood to refer to like parts, components and structures.

BEST MODE FOR CARRYING OUT THE INVENTION

FIGS. 1 to 7D and various embodiments discussed below, used for describing principles of the present disclosure in this patent document are intended for showing only embodiments, and should not be construed as anything limiting the scope of the disclosure. A person of ordinary skill in the art would understand that the principle of the present disclosure may be implemented in a properly arranged arbitrary wireless network.

The embodiments of the present invention described below include a plurality of wireless Access Points (APs) and a plurality of stations (STAs), and provide a Radio Resource Management (RRM) technique optimized in a wireless network environment that supports multimedia traffic such as Voice over Internet Protocol (VoIP). As a representative radio resource management technique, a Transmit Power Control (TPC) technique for adjusting an inter-cell interference and a communication range via transmission power selection of each AP, and a Dynamic Channel Assignment (DCA) technique for dynamically allocating a channel to an AP to adaptively adjust an inter-cell interference may be considered. Embodiments of the present invention allocate optimized transmission power and optimized channel to an AP via one technique performing TPC/DCA in a combination manner.

Before describing embodiments of the present invention specifically, the conventional radio resource management technique is described.

The conventional radio resource management technique independently performs the TPC technique and the DCA technique that influence each other. However, when the TPC technique and the DCA technique operate independently, transmission power and a channel cannot find optimized values or determination of transmission power influences channel determination and also the channel determination influences the determination of the transmission power, so that a case where values of an allocated channel and transmission power continue to change even without change of a network.

The conventional radio resource management technique shows limited performance depending on a method that utilizes measurement information. For example, a TCP technique proposed by Cisco company does not consider operation channels of a relevant AP and a neighbor AP when selecting transmission power. Through this method, complexity may be reduced and convenience may be achieved when it is performed independently of the DCA technique, but since a factor substantially influencing performance is an AP or stations operating in the same channel, power selection without channel consideration reduces accuracy. For another example, the conventional DCA techniques defines a value obtained by simply summing signal intensities or multiplying a channel occupy time and summing the same as a criterion of AP performance, so that they have a limitation that cannot accurately predicts the performance of an actual AP.

An actual performance of a radio resource management technique is different depending on object traffic. Particularly, since multimedia traffic such as VoIP, etc. is more sensitive to a packet loss, separate consideration for this is required during radio resource management. The conventional techniques use a method of optimizing transmission rates with consideration of the possible transmission rates when selecting transmission power. These techniques may obtain a large amount of processsings in case of data traffic, but have a limitation that cannot guarantee Quality of Service (QoS) of multimedia traffic.

Therefore, embodiments of the present invention described below propose a technique for performing AP transmission power and channel allocation in a combination manner, for resource management optimized for a wireless network environment that supports multimedia traffic such as a VoIP service, etc.

FIG. 1 is a view illustrating a structure of a wireless network to which embodiments of the present invention are applied. The wireless network includes a plurality of APs AP1-AP4, a plurality of stations STA1-STA5, and a controller 200. The AP1 provides a service to stations STA1 and STA2 included in a service coverage inside a CELL 1. The AP2 provides a wireless service to a station STA3 included in a service coverage inside a CELL 2. The AP3 provides a wireless service to a station STA4 included in a service coverage inside a CELL 3. The AP4 provides a wireless service to a station STA5 included in a service coverage inside a CELL 4. The AP1-AP4 are connected to a network and provide various services provided by the network to the stations STA1-STA5. For example, the AP1-AP4 may provide multimedia traffic such as VoIP to the stations STA1-STA5. Here, though an example where one AP services one cell has been illustrated, a proper number of APs may service one cell.

The stations STA1-STA5 may access the AP1-AP4 wirelessly, and may be a smartphone or a tablet, a notebook, a camera, etc. having a wireless access function.

The controller 200 performs a function of managing a radio resource of a plurality of AP1-AP4 accessing the network. For example, the controller 200 performs a technique of selecting a channel and transmission power that are predicted to optimize performance based on information collected from the AP1-AP4.

FIG. 2 is a block diagram illustrating the construction of a wireless access device controller according to an embodiment of the present invention. The construction illustrated in FIG. 2 is for exemplary purpose only, and other constructions may be used without departing from the scope of embodiments of the present invention.

Referring to FIG. 2, the AP 200 includes a network interface 210, an information collector 220, and a resource manager 230. The network interface 210 is intended for an interface with a network. A plurality of APs access the network via the network interface 210.

The information collector 220 collects various information provided from the plurality of APs. For example, the information collector 220 collects information regarding received signal strength (RSS) between an AP and a neighbor AP, received in the neighbor AP after transmitted from the AP. For another example, the information collector 220 collects information regarding RSS between an AP and an internal STA, received in the internal STA inside a relevant cell after transmitted from the AP, or information regarding RSS between an AP and an internal STA of a neighbor cell, received in the internal STA of the neighbor cell, received in the internal STA of the neighbor cell after transmitted from the AP.

The resource manager 230 manages a radio resource for APs included in the network. For example, the resource manager 230 performs an optimized transmission power select operation and a dynamic channel allocation operation for each AP in a combination manner.

In an embodiment, the resource manager 230 performs a transmission power select operation for an AP on each of a plurality of channel settings, and predicts a network performance value. The resource manager 230 selects an optimized channel setting among the plurality of channel settings depending on the predicted network performance value, and allocates an optimized channel setting and an optimized transmission power corresponding to the optimized channel setting to an AP. The resource manager 230 determines a first transmission power meeting a cell outer condition between the AP and an AP selected among a plurality of APs, determines a second transmission power meeting a cell inner condition of the AP, determines an amount of interference influencing a neighbor cell based on the first transmission power, the second transmission power, and an index representing a traffic load, and calculates the network performance value from the determined amount of interference, thereby predicting the network performance value. The cell outer condition includes a case where signal strength between the AP and at least one external neighbor cell, collected by the information collector is less than the first threshold determined in advance. The cell inner condition includes a case where signal strength between the AP and at least one internal station belonging to the AP, collected by the information collector is greater than the second threshold determined in advance. The second threshold has a value less than the first threshold, and is adaptively set based on traffic information used for communication between the AP and the internal station.

In an embodiment, the resource manager 230 reduces transmission power of the AP step by step by a predetermined value, and determines maximum signal strength meeting a condition where signal strength received by an AP of the neighbor cell after transmitted from the AP or signal strength received by an internal station of the neighbor cell after transmitted from the AP among the transmission power reduced step by step becomes smaller than the first threshold, as the first transmission power. The signal strength received by the internal station of the neighbor cell after transmitted from the AP is determined based on downlink signal strength estimated based on uplink signal strength from the internal station of the neighbor cell to the AP. The signal strength received by the internal station of the neighbor cell after transmitted from the AP is determined based on uplink signal strength from the internal station of the neighbor cell to the AP, and downlink signal strength estimated based on the transmission power of the AP and transmission power of the internal station of the neighbor cell. The signal strength received by the internal station of the neighbor cell after transmitted from the AP is reported by the internal station of the neighbor cell.

In an embodiment, the resource manager 230 determines the second transmission power with consideration of a Signal-to-Interference-plus-Noise Ratio (SINR) that enables demodulation at a transmission error rate within a predetermined value, sum of a maximum interference signal and a noise strength serving as a determination reference of the first signal strength, and a margin value adaptively set based on traffic information in communication between the AP an the internal station.

In an embodiment, the resource manager 230 reduces transmission power of the AP step by step by a predetermined value, and determines minimum signal strength meeting a condition where signal strength received by an internal station of the AP after transmitted from the AP among the transmission power reduced step by step becomes greater than the second threshold, as the second transmission power.

In an embodiment, the resource manager 230 determines an amount of interference influencing the neighbor cell by reflecting an index representing the traffic load to a difference value between the first transmission power and the second transmission power. In the case where the first transmission power is greater than the second transmission power, the resource manager 230 multiplies the difference value by the index representing the traffic load to determine an amount of interference influencing the neighbor cell. In the case where the first transmission power is not greater than the second transmission power, the resource manager 230 multiplies a zero value by the index representing the traffic load to determine an amount of interference influencing the neighbor cell.

FIG. 3 is a block diagram illustrating the construction of an AP according to an embodiment of the present invention. The construction illustrated in FIG. 3 is provided for exemplary purpose only, and other constructions may be used without departing from the scope of embodiments of the present invention.

Referring to FIG. 3, the AP includes a transceiver 110, a controller 120, and a network interface 130. The transceiver 110 performs signal transmission/reception with wireless stations. The network interface 130 is intended for an interface with a network. The AP accesses the AP controller 200 via the network interface 130.

The controller 120 controls an overall operation of the AP. For example, the controller 120 measures received RSS. For another example, the controller 120 estimates RSS of a downlink transmitted from an AP to an STA. The controller 120 estimates RSS of a downlink using uplink RSS which the AP has received from the STA.

FIG. 4 is a flowchart illustrating a resource management operation according to an embodiment of the present invention. According to this process flow, an RRM technique for selecting a channel and transmission power predicted to optimize performance based on information collected from APs is performed. According to this RRM, transmission power and a channel are allocated via one technique that performs the TPC and the DCA in a combination manner instead of performing the TPC and the DCA independently based on information received from the AP.

Referring to FIG. 4, an operation according to an embodiment of the present invention is performed by the AP controller illustrated in FIG. 2. The AP controller 200 collects information from an AP (S105), performs an RRM technique (S110, S115, S120), and transfers transmission power and channel allocation information to the AP (S125). A process for performing the RRM technique includes determining whether a TPC/DCA performance condition is met (S110), when the TPC/DCA performance condition is met, performing a TPC/DCA technique (S115), and allocating optimized transmission power and channel simultaneously (S120).

Before describing embodiments of the present invention specifically, concepts and terminologies proposed by embodiments of the present invention.

(1) Estimated RSS (ERSS)

In a wireless LAN environment, an STA may feed back downlink RSS received from an accessed AP using a radio measurement request/response message or a link measurement request/response message of IEEE 802.11k. In the case where downlink RSS is not fed back, assuming channel reciprocity between the AP and the STA, the AP estimates a downlink RSS value using an uplink RSS value [STA, AP] which the AP has received from the STA, and a difference between transmission power TxPower [AP] of the AP and transmission power TxPower [STA] of the STA. This is expressed by Equation (1).

$$\text{ERSS}[AP,STA]=\text{RSS}[STA,AP]+\text{TxPower}[AP]-\text{TxPower}[STA](\text{in dBm}) \quad (1)$$

(2) Cell Outer Condition

A first condition which an AP should meet in order to reduce transmission power according to the TPC technique proposed by an embodiment of the present invention is expressed by Equation (2) and Equation (3). The first condition should meet at least one of Equation (2) and Equation (3).

$$\text{RSS}[AP, \text{neighboring AP}] > \text{CCA\_thres}_{AP} \quad (2)$$

$$\text{ERSS}[AP, \text{neighboring STA}] > \text{CCA\_thres}_{STA} \quad (3)$$

If a signal transmitted by an AP is received by a predetermined threshold $\text{CCA\_threshold}_{AP}$ or more at an AP of a neighbor cell that uses the same cell as expressed in Equation (2) or received by a predetermined threshold $\text{CCA\_threshold}_{STA}$ or more at an STA of the neighbor cell as expressed in Equation (3), two cells belong to one contention domain, so that a spatial reuse does not occur. Therefore, when it is determined that RSS influencing an external cell that uses the same channel is higher than CCA threshold, the AP reduces transmission power.

(3) Cell Inner Condition

A second condition which an AP should meet in order to reduce transmission power according to the TPC technique proposed by an embodiment of the present invention is expressed by Equation (4)

$$\text{ERSS}[AP, \text{inner STA}] - 3 \text{ dBm} > S_{thres,dB} \quad (4)$$

In Equation (4), $S_{thres,dB}$ is minimum RSS that should be guaranteed for an STA inside a cell. Equation (4) denotes even after current transmission power of an AP should be reduced by a predetermined value (ex: 3 dB), the minimum RSS should be met for all STAs. At this point, $S_{thres,dB}$ is calculated using Equation (5).

$$S_{thres,dB}=\text{SINR}_{k,dB}(\text{CCA\_thres}_{STA}+\text{Noise\_Floor})_{dB}+\text{margin} \quad (5)$$

In Equation (5), $\text{SINR}_{k,dB}$ is an SINR value that may be demodulated within a specific Frame Error Rate (FER) (ex: 10%) with respect to a frame of a specific length (ex: 1500-byte frame) modulated using a minimum Modulation and Coding Selection (MCS) k that is to be guaranteed in communication between an AP and an STA.

In Equation (5), $(\text{CCA\_thres}_{STA}+\text{Noise\_Floor})_{dB}$ is sum of a maximum signal and a noise strength with respect to an interference signal detected at RSS lower than CCA threshold and not generating contention.

In Equation (5), margin is a value for considering a rise of an SINR value required when a frame of a length greater than a specific length (ex: 1500-byte) is transmitted by frame aggregation in $S_{thres,dB}$, and guaranteeing a loss of additional RSS by channel fading. A system manager may properly set a margin value depending on whether frame aggregation is used and whether an RSS loss by fading is compensated for with respect to a signal of what %. The system manager may guarantee performance of relevant traffic by adaptively setting a margin value depending on traffic.

(4) Desirable Power Decrease (DPD)

$\text{DPD}_{i,j}$ means an amount of transmission power that should be lowered so that an $\text{AP}_i$ may not interfere with a cell j. That is, $\text{DPD}_{i,j}$ is a minimum amount of transmission power which the $\text{AP}_i$ should reduce so that the cell outer condition may not be met, and is defined by Equation (6).

$$\text{DPD}_{i,j}=\max(0,I_{i,j}(\text{RSS}_{i,j}^{max}-\text{CCA\_thres})) \quad (6)$$

In Equation (6), $\text{RSS}_{i,j}^{max}$ is a maximum value among RSS (dBm) which the $\text{AP}_i$ influences an STA or an AP located in a cell j, and $I_{i,j}$ is an indication function for a co-channel and is defined by Equation (7).

$$I_{i,j} = \begin{cases} 1, & \text{if cell } i \text{ and cell } j \text{ use a same channel} \\ 0, & \text{otherwise} \end{cases} \quad (7)$$

In Equation (7), $I_{i,j}$ has a value of 1 if a cell i and a cell j use the same channel, and has a value of 0 otherwise.

(5) Allowed Power Decrease (APD)

$\text{APD}_i$ means an amount of maximum transmission power which an $\text{AP}_i$ may reduce while guaranteeing an STA accessing the $\text{AP}_i$ performance. That is, $\text{APD}_i$ is an amount of transmission power of the AP that may be reduced maximally while meeting the cell inner condition, and is defined by Equation (8).

$$APD_i = \min\left(Tx_{max} - Tx_{min}, \left\lfloor \frac{ERSS_{i,i}^{min} - S_{thres,dB}}{3} \right\rfloor \times 3\right) \quad (8)$$

In Equation (8), $\text{ERSS}_{i,j}^{min}$ is RSS (dBm) which an $\text{AP}_i$ influences an STA whose RSS is lowest among STAs accessing the $\text{AP}_i$, and $\text{Tx}_{max}$ and $\text{Tx}_{min}$ are maximum transmission power and minimum transmission power that may be used by the AP, respectively. In the case where a minimum basis on which the AP may lower transmission power is 3 dB, the APD is set to be a multiple of 3.

(6) Residual Inter-Cell Interference (RII)

$RII_i$ represents an amount of interference influencing a neighbor cell after performing the TPC technique proposed by $AP_i$. Since transmission power cannot be reduced any more when a cell inner condition is not met though the cell outer condition is met, an amount of interference inevitably influencing the outside is defined by Equation (9).

$$RII_i = \text{load}_i \cdot \sum_i \max(0, DPD_{i,j} - APD_i) \qquad (9)$$

In Equation (9), $\text{load}_i$ is an index representing a traffic load of $AP_i$, and various values such as a transmission time or a given source traffic rate, etc. may be used. A $RII_i$ value is determined depending on multiplication result of a larger value of a difference value of an $APDi$ value from a $DPDi,j$ value, and a zero(0) value, and a $\text{load}_i$ value.

(7) RSS Matrix

The AP controller 200 configures an RSS matrix M for obtaining an APD and a DPD based on information fed back from an AP. The RSS matrix M is configured using Equation (10).

$$[M]_{i,j} = \begin{cases} ERSS_{i,i}^{min}, & i = j \\ RSS_{i,j}^{max} & i \neq j \end{cases} \qquad (10)$$

Each AP has a separate monitoring unit to measure RSS received from a different AP or STA regardless of a channel. The AP controller 200 collects RSSs measured by respective APs to obtain an RSS matrix M.

(8) Channel Assignment Initiator (CAI)

The DCA technique according to an embodiment of the present invention allocates transmission power and a channel via repeated local search. One AP that becomes a start point is selected every each local search, and this selected AP is CAI.

(9) Network Cost, $C_{net}$ $C_{net}$ is an index representing a network performance. As this value increases, an entire performance of a network reduces. A network cost $C_{net}$ is defined by sum of RII, and this is expressed by Equation (11).

$$C_{net} = \sum_i RII_i \qquad (11)$$

$n_{fn}$ is a value for limiting a size of a local search space when allocating a channel. When neighbor APs of a CAI is aligned in an RSS sequence, $n_{fn}$ APs whose RSS is high are defined as a first-hop neighbor AP.

FIG. 5 is a flowchart illustrating a TPC/DCA operation according to an embodiment of the present invention. For example, FIG. 5 specifically illustrates a process flow of the TPC/DCA operation illustrated in FIG. 4. This process flow is performed by the AP controller 200 illustrated in FIG. 2.

Referring to FIG. 5, the AP controller 200 generates a CAI set including all APs on a wireless network (ex: LAN) (S205), and arbitrarily selects one CAI AP (S215). Next, the AP controller 200 determines first-hop neighbor APs with respect to the selected CAI (S220), and extracts possible channel setting groups with respect to the CAI and first-hop neighbor APs (S225). At this point, since the possible channel setting groups becomes too large when the number of the first-hop neighbor APs is too large, a proper nfn is set so that a channel search may be finished within a limited time depending on an operation capability of the AP controller 200.

Next, the AP controller 200 determines transmission power of each AP depending on a cell outer condition and a cell inner condition with respect to each channel setting inside a channel setting group (S230), and calculates RII that depends on the determined transmission power, and a network cost (S235).

Next, the AP controller 200 selects a channel setting having a lowest network cost value among a channel setting group (S240), and excludes selected CAI and first-hop neighbor AP from a CAI set (S245).

The above processes are repeated until all APs are excluded from the CAI set. That is, the AP controller 200 repeats the above processes S215-S245 until it is determined that the CAI set is empty (S210), and when it is determined that the CAI set is empty, the AP controller 200 ends a channel search (S250).

According to an embodiment of the present invention illustrated in FIGS. 4 and 5, the AP controller 200 performs a technique of collecting signals measured from APs, processing the same as useful information, and selecting transmission power of APs based on the processed information. This transmission power selection technique includes an operation of predicting downlink ERSS based on uplink RSS from an STA to an AP. Also, the transmission power selection technique includes an operation of guaranteeing QoS by applying a cell inner condition based on RSS information or an ERSS value of a station fed back via a radio measurement request/response and a link measurement request/response of IEEE 802.11k. Also, a transmission power selection technique include an operation of limiting an inter-cell interference by applying a cell outer condition based on RSS information between respective APs. Also, the transmission power selection technique includes an operation of guaranteeing QoS by adaptively setting a margin value of a cell inner condition based on traffic information.

Also, according to an embodiment of the present invention, the AP controller 200 performs a technique of selecting transmission power and allocating a channel in a combination manner by predicting performance with consideration of a transmission power selection technique when allocating a dynamic channel. This combinational technique includes an operation of allowing a cell outer condition and a cell inner condition used for transmission power selection to correspond to a DPD and an APD of a channel allocation technique to perform the two techniques in a combination manner. Also, the combinational technique includes an operation of predicting a network performance via an RII that utilizes a DPD and an APD, and traffic load information.

FIG. 6 is a view illustrating an example of information collection by a transmission power control and dynamic channel allocation operation according to an embodiment of the present invention.

Referring to FIG. 6, under an environment where four cells exist, a monitoring unit (the operation may be performed in the controller 120 illustrated in FIG. 3) of an AP collects RSS information from neighbor AP and STA while changing an entire channel. At this point, information that an AP stores and transfers to the AP controller 200 is lowest RSS among signals given to an STA inside a cell of the AP, and strongest RSS for different each cell. The AP controller 200 collects collected information to configure an RSS matrix M.

FIGS. 7A to 7D are views illustrating examples of a TPC/DCA operation according to an embodiment of the present invention. These drawings represent an example of an RSS matrix M under an environment where nine cells exist.

Referring to FIG. 7A, the AP controller collects RSS information between cells transferred from each AP to obtain an RSS matrix.

Referring to FIG. 7B, the AP controller processes an RSS matrix according to a co-channel indicate function $I_{i,j}$ according to channel setting. FIG. 7B illustrates an example where three channels are available and channel setting is [1 2 3 2 1 2 3 2 1]. That is, in the case where cell 1, cell 5, and cell 9 use No. 1 channel, cell 2, cell 4, cell 6, and cell 8 use No. 2 channel, and cell 3 and cell 7 use No. 3 channel, the matrix M illustrated in FIG. 7A is processed as illustrated in FIG. 7B. Here, it is assumed that only channels that do not overlap are used. For example, since cell 1 uses No. 1 channel, only results for cell 5 and cell 9 that use No. 1 channel remain and the rest of values become 0. Since cell 2 uses No. 2 channel, only results for cell 4 and cell 6 that use No. 2 channel remain and the rest of values become 0. Since cell 3 uses No. 3 channel, only a result for cell 7 that uses No. 3 channel remain and the rest of values become 0.

Referring to FIG. 7C, the AP controller obtains DPD and APD values using a processed matrix M. Values marked by □ in the illustrated matrix represent DPD values, and values marked by ○ represent APD values. A DPD value is obtained by subtracting a CCA threshold value from a non-diagonal term in the matrix illustrated in FIG. 7B. Here, a constant CCA threshold value of −90 dBm has been assumed. An APD value is obtained by subtracting a CCA threshold value from a diagonal term in the matrix illustrated in FIG. 7B. Here, STAs of the same kind and traffic have been assumed, and $S_{thres,dB}$ value of −78 dBm has been assumed.

Referring to FIG. 7D, an RII value of each AP and a network cost are obtained via the DPD and APD obtained from the example illustrated in FIG. 7C. When the APD and DPD are obtained, transmission power of an AP is automatically determined, and transmission power is reduced by 3 dB until a minimum value of a maximum DPD value and an APD in current transmission power becomes smaller than 3 dB. An RII value of each AP and a network cost may be obtained via the obtained DPD and APD.

FIGS. 7A to 7D illustrate an example of a process for obtaining a network cost value with respect to one channel setting. However, a network cost is obtained in the above-described method with respect to all channel settings. Channel setting that minimizes a network cost value is allocated as optimized channel setting, and a transmission power allocation value of this point is selected as optimized transmission power. As described above, the TPC and DCA are performed in a combination manner.

As described above, an embodiment of the present invention proposes a technique of performing, in a combination manner, transmission power selection and channel allocation for resource management optimized for a wireless network environment supporting multimedia traffic such as VoIP service, etc. In the case where the conventional art performs transmission power selection and dynamic channel allocation independently, transmission power influences channel allocation, and the channel allocation influences the transmission power selection, so that in the case where each allocation is made on the assumption that a counterpart is a given value, an optimized value cannot be found and transmission power and channel allocation change continuously. Also, consideration of multimedia traffic more sensitive to a loss compared to data traffic is not sufficiently given, so that QoS may not be guaranteed.

However, an embodiment of the present invention may find transmission power and a channel close to optimized transmission power and channel, and expect corresponding performance improvement of a wireless LAN by allocating transmission power and a channel in a combination manner. Also, since transmission power is controlled via variables adaptively settable depending on traffic, traffic-aware resource allocation may be made. A performance appraisal criterion called RII proposed by an embodiment of the present invention is a criterion of quantifying an amount of performance reduction by inter-cell contention. The RII is applicable to various radio resource management techniques under a concentrated wireless LAN environment where contention is a primary cause of performance reduction.

Therefore, it may be expected that a transmission power selection and dynamic channel allocation technique according to an embodiment of the present invention becomes a basis of an integrated radio resource management technique for high quality wireless network establishment. Particularly, it is expected that the transmission power selection and dynamic channel allocation technique according to an embodiment of the present invention is usefully used for wireless enterprise network establishment under a concentrated wireless LAN environment.

As described above, though the present invention has been described using limited embodiments and drawings, the present invention is not limited to the above embodiments, and a person of ordinary skill in the art would understand various modifications and changes may be made from these descriptions. For example, though a case where the embodiments of the present invention are applied to the network environment as illustrated in FIGS. 1 and 7A to 7D has been described, the scope of the present invention is not limited to this. For another example, though description that the embodiments of the present invention are performed by the AP controller and elements of the AP illustrated in FIGS. 2 and 3, respectively, and performed according to the flows illustrated in FIGS. 4 and 5 has been made, the operation according to the embodiments of the present invention may be implemented in various forms.

Meanwhile, in the case where the operation according to the embodiment of the present invention is performed by a controller such as a processor, a program instruction for performing the operation may be recorded on a computer-readable medium. The computer-readable medium may include a program instruction, a data file, a data structure, etc. independently, or a combination manner. The program instruction may be things specially designed and configured for the present invention, or known to and available by a person of ordinary skill in the art. Examples of the computer-readable medium includes a hard disk, a magnetic medium such as a floppy disk and a magnetic tape, an Optical recording medium such as a CD-ROM or a DVD, a magnetic optical medium such as a floptical disk, and a hardware device specially configured to store and perform a program instruction such as ROM, RAM, a flash memory, etc. Examples of a program instruction includes not only a machine language code such as things generated by a complier but also a high level language code executable on a computer using an interpreter, etc. In the case where all or a portion of a base station or a relay described in the present invention is implemented in a computer program, a computer-readable recording medium recording the computer program is also included in the present invention. Therefore, the scope of the present invention should not be limited to the described embodiments but determined by not only the appended claims but also equivalent thereof.

The invention claimed is:

1. A method for operating an access point (AP) in a wireless communication network, the method comprising:
   determining a first transmission power associated with an interference to at least one neighbor cell and a second transmission power associated with a received signal power of a terminal on each of a plurality of channel settings;
   determining interference values corresponding to the plurality of channel settings based on the first transmission power and the second transmission power;
   determining a channel setting among the plurality of channel settings based on the interference values; and
   transmitting a signal using a transmission power corresponding to the channel setting.

2. The method of claim 1, wherein the determining of the first transmission power and the second transmission power, determining of the interference values and determining of the channel setting comprises:
   determining the first transmission power based on a cell outer condition between the AP and APs determined among a plurality of APs;
   determining the second transmission power based on a cell inner condition of the AP;
   determining an amount of an interference influencing a neighbor cell based on the first transmission power, the second transmission power, and an index representing a traffic load; and
   determining a network performance value based on the determined amount of the interference,
   wherein the cell outer condition comprises a case where received signal strength (RSS) between the AP and at least one external neighbor cell is less than a predetermined first threshold, and
   wherein the cell inner condition comprises a case where RSS between the AP and at least one terminal belonging to the AP is greater than a predetermined second threshold.

3. The method of claim 2, wherein the second threshold is less than the first threshold and is determined based on traffic information used for communication between the AP and the terminal belonging to the AP.

4. The method of claim 3, wherein the determining of the first transmission power comprises:
   reducing transmission power of the AP by a predetermined value; and
   determining maximum RSS based on a condition where RSS received by an AP of the neighbor cell or RSS received by a terminal of the neighbor cell becomes smaller than the first threshold among the transmission power reduced as the first transmission power.

5. The method of claim 3, wherein the second transmission power is determined based on a signal-to-interference-plus-noise-ratio (SINR) that enables demodulation at a transmission error rate within a predetermined value in communication between the AP and the terminal belonging to the AP, sum of maximum interference signal and noise strength serving as a determination reference of first signal strength, and a margin value based on traffic information.

6. The method of claim 3, wherein the determining of the second transmission power comprises:
   reducing transmission power of the AP by a predetermined value; and
   determining minimum RSS based on a condition where RSS received by an terminal of the AP is greater than the second threshold among the transmission power reduced as the second transmission power.

7. An access point (AP) in a wireless communication network, the AP comprising:
   at least one processor configured to:
      determine a first transmission power associated with an interference to at least one neighbor cell and a second transmission power associated with a received signal power of a terminal on a plurality of channel settings;
      determine interference values corresponding to the plurality of channel settings based on the first transmission power and the second transmission power; and
      determine a channel setting among the plurality of channel settings based on the interference values; and
   a transceiver configured to transmit a signal using a transmission power corresponding to the channel setting.

8. The AP of claim 7, wherein the at least one processor is further configured to:
   determine the first transmission power based on a cell outer condition between the AP and APs determined among a plurality of APs,
   determine the second transmission power based on a cell inner condition of the AP,
   determine an amount of an interference influencing a neighbor cell based on the first transmission power, the second transmission power, and an index representing a traffic load, and
   determine a network performance value based on the determined amount of the interference,
   wherein the cell outer condition comprises a case where received signal strength (RS S) between the AP and at least one external neighbor cell is less than a predetermined first threshold, and
   wherein the cell inner condition comprises a case where RSS between the AP and at least one terminal belonging to the AP is greater than a predetermined second threshold.

9. The AP of claim 8, wherein the second threshold is less than the first threshold and is determined based on traffic information used for communication between the AP and the terminal belonging to the AP.

10. The AP of claim 9, wherein the at least one processor is further configured to:
    reduce transmission power of the AP by a predetermined value, and
    determine maximum RSS based on a condition where RSS received by an AP of the neighbor cell or RSS received by a terminal of the neighbor cell becomes smaller than the first threshold among the transmission power reduced as the first transmission power.

11. The AP of claim 9, wherein the at least one processor is further configured to determine the second transmission power based on a signal-to-interference-plus-noise-ratio (SINR) that enables demodulation at a transmission error rate within a predetermined value in communication between the AP and the terminal belonging to the AP, sum of maximum interference signal and noise strength serving as a determination reference of first signal strength, and margin value determined based on traffic information.

12. The AP of claim 9, wherein the at least one processor is further configured to:
reduce transmission power of the AP by a predetermined value, and
determine minimum RSS based on a condition where RSS received by a terminal of the AP is greater than the second threshold among the transmission power reduced as the second transmission power.

13. A method for allocating transmission power of at least one access point (AP) in a wireless communication network, the method comprising:
determining first transmission power meeting a cell outer condition between the AP and APs selected among a plurality of APs; and
determining second transmission power smaller than the first transmission power and meeting a cell inner condition of the AP, wherein the cell outer condition comprises a case where signal strength between the AP and at least one external neighbor cell is less than a first threshold determined in advance, wherein the cell inner condition comprises a case where signal strength between the AP and at least one internal station belonging to the AP is greater than a second threshold determined in advance, and wherein the second threshold has a value less than the first threshold, and is adaptively set based on traffic information used for communication between the AP and the internal station.

14. The method of claim 13, wherein the determining of the first transmission power comprises:
reducing transmission power of the AP step by step by a predetermined value, and
determining maximum RSS meeting a condition where RSS received by an AP of the neighbor cell after transmitted from the AP becomes smaller than the first threshold among the transmission power reduced step by step as the first transmission power.

15. The method of claim 13, wherein the second transmission power is determined with consideration of a signal-to-interference-plus-noise-ratio (SINR) that enables demodulation at a transmission error rate within a predetermined value in communication between the AP and the internal station, sum of maximum interference signal and noise strength serving as a determination reference of first signal strength, and a margin value adaptively set based on traffic information.

16. The method of claim 13, wherein, the determining of the second transmission power comprises:
reducing transmission power of the AP step by step by a predetermined value, and
determining minimum RSS meeting a condition where RSS received by an internal station of the AP after transmitted from the AP is greater than the second threshold among the transmission power reduced step by step as the second transmission power.

17. An apparatus for allocating transmission power of at least one access point (AP) in a wireless communication network, the apparatus comprising:
an information collector configured to collect information regarding signal strength between the AP and at least one external neighbor cell, and signal strength between the AP and at least one internal station belonging to the AP; and
a resource manager configured to determine first transmission power meeting a cell outer condition between the AP and APs selected among a plurality of APs, and determine second transmission power smaller than the first transmission power and meeting a cell inner condition of the AP, wherein the cell outer condition comprises a case where signal strength between the AP and at least one external neighbor cell is less than a first threshold determined in advance, wherein the cell inner condition comprises a case where signal strength between the AP and at least one internal station belonging to the AP is greater than a second threshold determined in advance, and wherein the second threshold has a value less than the first threshold, and is adaptively set based on traffic information used for communication between the AP and the internal station.

18. The apparatus of claim 17, wherein the resource manager is configured to reduce transmission power of the AP step by step by a predetermined value, and determine maximum RSS meeting a condition where RSS received by an AP of the neighbor cell after transmitted from the AP becomes smaller than the first threshold among the transmission power reduced step by step as the first transmission power.

19. The apparatus of claim 17, wherein the resource manager is configured to determine the second transmission power with consideration of a signal-to-interference-plus-noise-ratio (SINR) that enables demodulation at a transmission error rate within a predetermined value in communication between the AP and the internal station, sum of maximum interference signal and noise strength serving as a determination reference of first signal strength, and a margin value adaptively set based on traffic information.

20. The apparatus of claim 17, wherein the resource manager is configured to reduce transmission power of the AP step by step by a predetermined value, and determine minimum RSS meeting a condition where RSS received by an internal station of the AP after transmitted from the AP is greater than the second threshold among the transmission power reduced step by step as the second transmission power.

* * * * *